(12) United States Patent
Ledford et al.

(10) Patent No.: US 10,957,456 B2
(45) Date of Patent: Mar. 23, 2021

(54) FUEL RODS WITH WEAR-INHIBITING COATINGS

(71) Applicant: GLOBAL NUCLEAR FUEL—AMERICAS, LLC, Wilmington, NC (US)

(72) Inventors: Kevin L. Ledford, Wilmington, NC (US); Yuk-Chiu Lau, Schenectady, NY (US); David W. White, Wilmington, NC (US); Yang-Pi Lin, Wilmington, NC (US); Paul E. Cantonwine, Wilmington, NC (US); Nicholas R. Gullette, Wilmington, NC (US); Timothy W. Clark, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 760 days.

(21) Appl. No.: 15/911,536

(22) Filed: Mar. 5, 2018

(65) Prior Publication Data
US 2018/0254110 A1    Sep. 6, 2018

Related U.S. Application Data

(63) Continuation of application No. 13/786,438, filed on Mar. 5, 2013, now Pat. No. 9,911,511, which is a
(Continued)

(51) Int. Cl.
| | |
|---|---|
| *G21C 3/07* | (2006.01) |
| *G21C 21/02* | (2006.01) |
| *C23C 24/04* | (2006.01) |

(52) U.S. Cl.
CPC ............... *G21C 3/07* (2013.01); *G21C 21/02* (2013.01); *C23C 24/04* (2013.01); *Y02E 30/30* (2013.01)

(58) Field of Classification Search
CPC ............ G21C 3/07; G21C 21/02; C23C 24/04
(Continued)

(56) References Cited

U.S. PATENT DOCUMENTS

| 5,434,896 A * | 7/1995 | Bryan | ................... G21C 3/07 376/414 |
|---|---|---|---|
| 8,971,476 B2 * | 3/2015 | Mazzoccoli | ............. G21C 3/07 376/457 |

(Continued)

OTHER PUBLICATIONS

Karthikeyan, "Cold Spray Technology: International Status and USA Efforts", ASB Industries, pp. 1-14, Dec. 2004. (Year: 2004).*
(Continued)

*Primary Examiner* — Jack W Keith
*Assistant Examiner* — Daniel Wasil
(74) *Attorney, Agent, or Firm* — Ryan Alley IP

(57) ABSTRACT

Nuclear reactor components are treated with thermal methods to increase wear resistance. Example treatments include thermal treatments using particulate or powderized materials to form a coating. Methods can use cold spray, with low heat and high velocities to blast particles on the surface. The particles impact and mechanically deform, forming an interlocking coating with the surface and each other without melting or chemically reacting. Materials in the particles and resultant coatings include metallic alloys, ceramics, and/or metal oxides. Nuclear reactor components useable with methods of increased wear resistance include nuclear fuel rods and assemblies containing the same. Coatings may be formed on any desired surface, including fuel rod positions where spacer contact and fretting is most likely.

7 Claims, 4 Drawing Sheets

Related U.S. Application Data continuation-in-part of application No. 13/729,704, filed on Dec. 28, 2012, now Pat. No. 9,646,722.

(58) Field of Classification Search
 USPC .................................. 376/414, 416, 417, 457
 See application file for complete search history.

(56) References Cited

U.S. PATENT DOCUMENTS

| | | | | |
|---|---|---|---|---|
| 2006/0090593 | A1* | 5/2006 | Liu | C23C 24/04 |
| | | | | 427/199 |
| 2007/0031591 | A1* | 2/2007 | Junker | C23C 24/04 |
| | | | | 427/140 |
| 2009/0022259 | A1* | 1/2009 | Gray | G21C 3/324 |
| | | | | 376/416 |
| 2014/0241485 | A1* | 8/2014 | Di Fonzo | G21C 3/07 |
| | | | | 376/414 |

OTHER PUBLICATIONS

Neer, "Surface Modification of Fuel Cladding Materials With Integral Fuel Burnable Absorber Boron", Dr. Sridharan, pp. 1-38, Nov. 2008. (Year: 2008).*

Jung, "Manufacturing Process for the Metal-Ceramic Hybrid Fuel Cladding Tube", Korean Nuclear Society, Oct. 2012. (Year: 2012).*

* cited by examiner

FUEL RODS WITH WEAR-INHIBITING COATINGS

PRIORITY STATEMENT

This application is a continuation of, and claims priority under 35 U.S.C. § 120 to, U.S. Pat. No. 9,911,511 issued Mar. 6, 2018, which is a continuation-in-part of U.S. Pat. No. 9,646,722 issued May 9, 2017. The contents of these parent applications and US Patent Publication 2009/0022259 published Jan. 22, 2009, are incorporated by reference herein in their entireties.

BACKGROUND

Boiling water nuclear reactors operate for many years. Commencing with their initial construction and through their service lives, these reactors may accumulate debris in their closed circulation moderator systems. This debris can become an operating hazard if the debris is allowed to enter into the fuel bundle-containing core region. In order to understand this problem, a summary of reactor construction as it relates to the accumulation of debris in the core is described, as well as fuel bundle construction and the effects of debris entering into the fuel rod region of the fuel bundles.

Boiling Water Reactors are provided with a large, central core. Liquid water coolant/moderator flow enters the core from the bottom and exits the core as a water steam mixture from the top. The core includes many side-by-side fuel bundles. Water is introduced into each fuel bundle through a fuel bundle support casting from a high pressure plenum which is situated below the core. Water passes in a distributed flow through the individual fuel bundles, is heated to generate steam, and exits the upper portion of the core as a two phase water steam mixture from which the steam is extracted for the generation of energy.

The core support castings and fuel bundles are a source of pressure loss in the circulation of water through the core. This pressure loss assures the substantially even distribution of flow across the individual fuel bundles of the reactor core. There may be approximately 750 individual fuel bundles in a reactor core, so uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly, in which the lower tie plate is a cast structure. The lower tie plate assembly includes at its lowest point a downward protruding bail covering an inlet nozzle. This inlet nozzle includes entry to an enlarged flow volume within the lower tie plate. At the upper end of the flow volume, there is located a rod supporting grid. Between the supporting grid and the nozzle there is defined a flow volume.

The rod supporting grid has two purposes. First, the rod supporting grid provides the mechanical support connection for the weight of the individual fuel rods to be transmitted through the entire lower tie plate to the fuel support casting. Secondly, the rod supporting grid provides a flow path for liquid water moderator into the fuel bundle for passage in between the side-by-side supported fuel rods.

Above the lower tie plate, each fuel bundle includes a matrix of upstanding fuel rods, which are sealed tubes each containing fissionable material which when undergoing nuclear reaction produce the power generating steam. At the upper end of the matrix of upstanding fuel rods is located an upper tie plate. This upper tie plate holds at least some of the fuel rods in vertical side-by-side alignment. Some of the fuel rods are attached to both the upper and lower tie plates. Between the upper and lower tie plates, there are usually included water rods to enhance water moderator to fuel ratio, particularly in the upper, highest void fraction region of the fuel bundle.

Fuel bundles also include about seven to nine fuel rod spacers at varying elevations along the length of the fuel bundle. These spacers are required because the fuel rods are long and slender, and would come into contact under the dynamics of fluid flow and nuclear power generation within the fuel bundles. The spacers provide appropriate restraints for each fuel rod at their respective elevations and thus prevent abrading contact between the fuel rods and maintain the fuel rods at uniform spacing relative to one another along the length of the fuel bundle for optimum performance.

Each fuel bundle is surrounded by a channel. This channel causes water flowing between the tie plates to be restricted to only one bundle in an isolated flow path between the tie plates. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is important. From the lower (high pressure) plenum inlet to the core to the outlet from the core of the steam and water mixture through the upper tie plates of the fuel bundles, about 20 pounds per square inch (psi) of pressure drop is encountered at typical operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates of the reactor. At the lower tie plate of each fuel bundle, from the inlet nozzle into the flow volume and through the fuel rod supporting grid, about 1 to about 11/2 psi pressure drop occurs which contributes to establishing flow distribution between the individual fuel rods of each fuel bundle. Finally, through the fuel bundle itself—from the lower supporting grid to the exit at the upper tie plate—about 11 psi of pressure drop usually occurs.

Typically debris within boiling water nuclear reactors can include extraneous materials left over from reactor construction. Corrosion during the reactor lifetime also liberates debris. Further debris can be introduced during the numerous outages and repairs of the nuclear reactor. Nuclear reactors include closed circulation systems that essentially accumulate debris with increasing age.

A particularly vexing and usual place for the accumulation of debris is in the fuel bundles between the fuel rods particularly in the vicinity of the fuel rod spacers. Debris particles tend to lodge between the spacer structure and the fuel rods and often dynamically vibrate with the coolant/moderator flow in abrading contact to the sealed cladding of the fuel rods. Such flow induced vibration within the reactor can cause fretting and eventually damage and/or rupture of the cladding of the fuel rods. The rupture of the cladding may lead to the undesirable release of fission gas accumulated and sealed within the fuel rod prior to the rupture. If sufficient fission gas has been released due to cladding ruptures, plant shutdown could be necessary.

Modern nuclear plants have both redundancy and many safety systems designed to counteract anticipated operating fuel failures, such as fuel rods becoming punctured by debris. As such, these failures may not affect safety; however, in almost all cases they result in the plant operating at less than optimum efficiency.

SUMMARY

Example embodiments and methods include creating a resilient surface in a nuclear environment by using a thermal treatment to create a coating from particulate or powderized materials. Example methods include HVOF and HVAF, which use significant temperature elevation, and cold spray, which does not. In cold spray, entrained particles of the coating material are flowed at significant speeds toward the surface in order to flatten and mechanically bond with the surface and each other, without significant phase change in the materials or surface. The cold spray makes preparatory grit blasting wholly optional and is also compatible with a post-processing shot-peening for desired density and surface characteristics. Coatings used in example embodiments and methods may be formed from transition metals and combinations of metallic alloys and hard-phase materials. For example, any metallic alloy, ceramic, and/or metal oxide can be used in creating a desired coating, including chromium and aluminum alloys, transition metal oxides and carbides, and/or silicon carbides.

Example embodiments include nuclear reactor components having wear-resistance through example methods, including coated nuclear fuel rods and assemblies containing the same. Coatings may be formed on any desired surface, including fuel rod positions where spacer contact and fretting is most likely.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
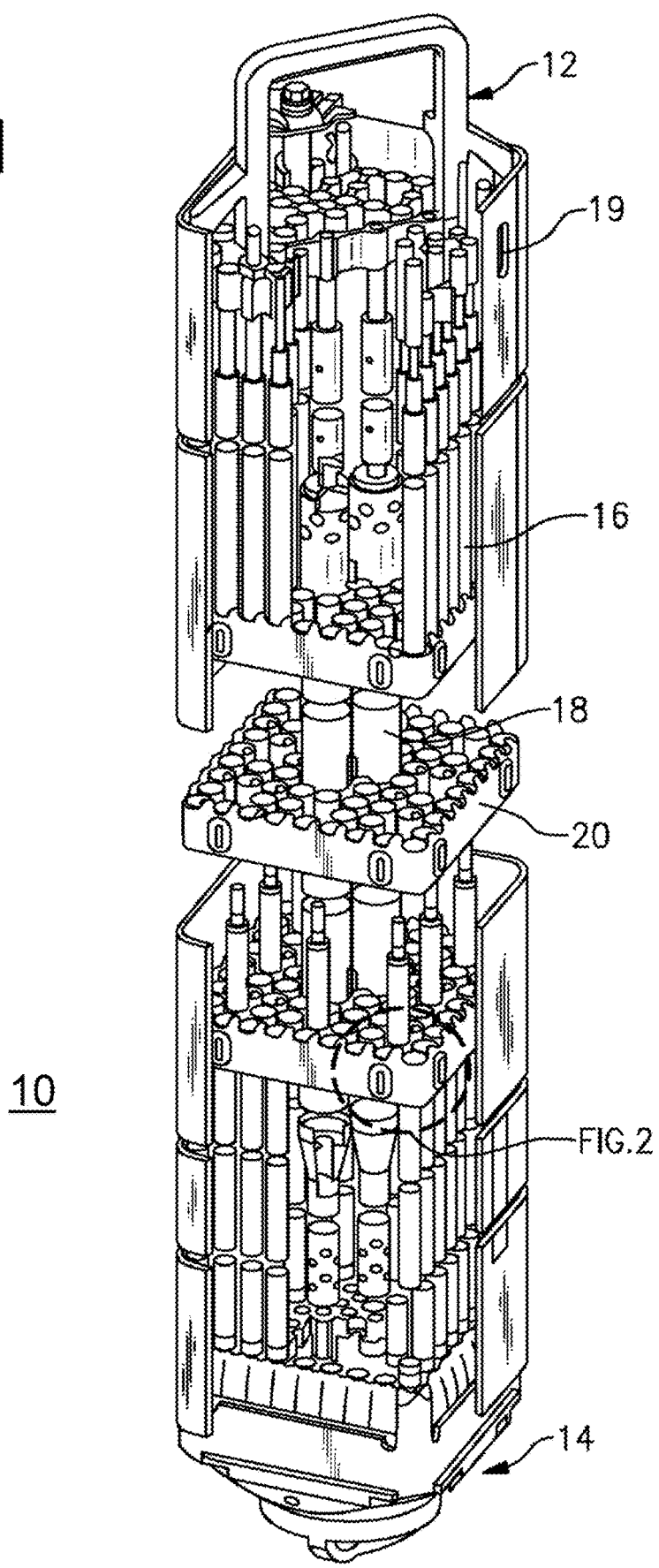
FIG. 1 is an illustration of a section of a related art nuclear fuel assembly.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

FIG. 1 is an illustration of an example embodiment fuel assembly 10. As shown in FIG. 1, fuel assembly 10 includes an upper tie plate 12 and a lower tie plate 14, capturing at opposite ends a plurality of fuel rods 16. In the case of BWR assemblies, assembly 10 may contain one or more water rods 18. A plurality of spacer grids 20 are disposed along the length of the fuel rods 16 at locations between tie plates 12 and 14. In the case of BWR assemblies, the assembly 10 may contain a channel structure 19 enclosing the fuel rods 16 and spacer grids 20.

Coolant supplied from below the lower tie plate 14 may carry debris and/or debris may otherwise be introduced to fuel rods 16 and spacer grids 20. As the coolant (water) flows upwardly, some debris can impact upon the exterior surface of the fuel rods 16, the spacer grids 20 and, in the case of BWR assemblies, enclosing channel structure 22, particularly at the lower ends thereof. In the case where a fuel assembly does not include a debris-catching device or screen, an even greater amount of debris may be expected to impact upon the exterior surface of the fuel rods 16, the spacer grids 20 and other components in the fuel assembly 10. The debris particles may be hardened by irradiation and fret an exterior of the fuel rods 16 as the water flows in the direction indicated by the arrow in FIG. 1.

Figure 2:
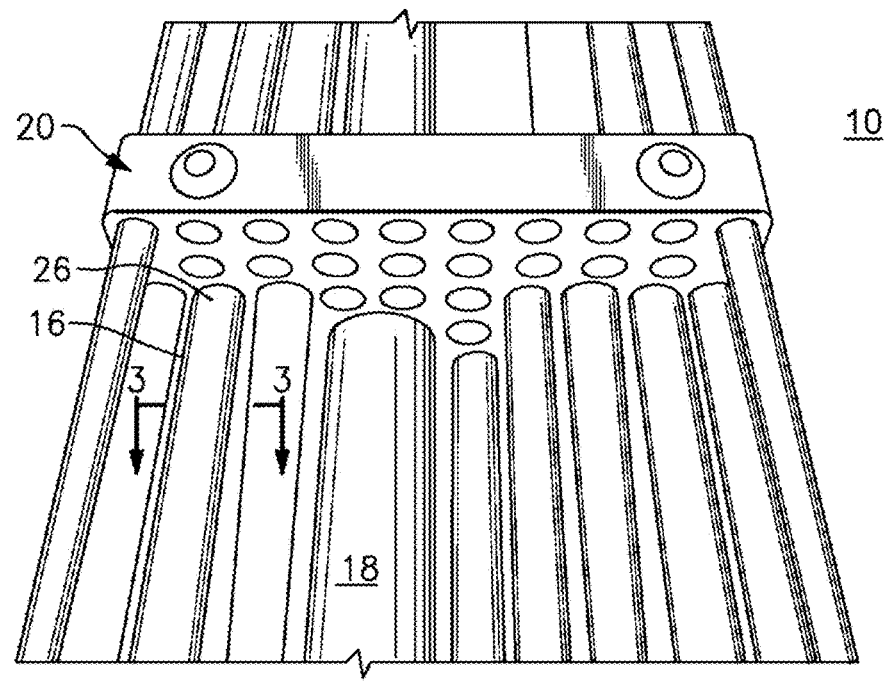
FIG. 2 is a detail illustration of an example embodiment nuclear fuel assembly.
Figure 3:
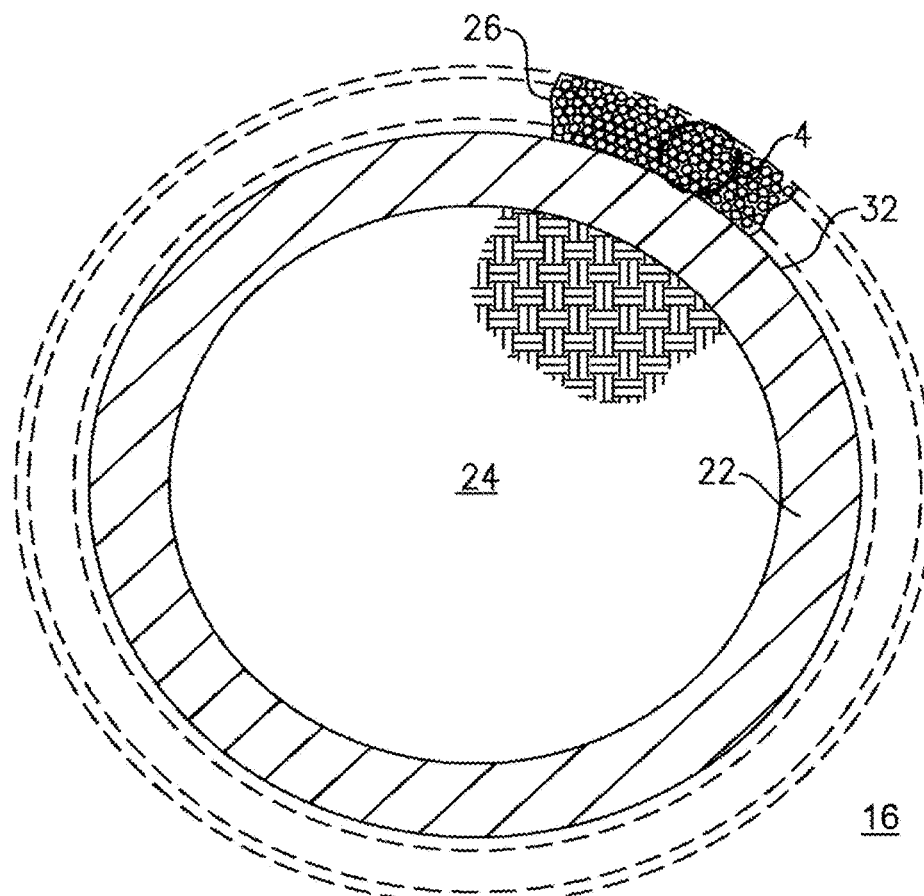
FIG. 3 is a cross-section illustration of an example embodiment fuel rod.

As shown in FIGS. 2 and 3, fuel rods 16 include a zirconium-alloy cladding tube or cladding tube 22 that contain fuel pellets 24 of fissionable material, such as for example, UO2, and the like. Cladding tube 22 may be fabricated of a higher-strength, lower-cross-sectioned material, such as a zirconium-tin alloy like Zircaloy-2, Zircaloy-4, etc.

As shown in FIG. 3, example embodiment fuel rods 16 further include a wear-inhibiting coating 26 on an exterior surface 32 of cladding tube 22, about an entire exterior of fuel rod 16 or in one or more areas or zones where fretting is expected to occur. For example, wear-inhibiting coating 26 may be selectively applied only at areas of potential fretting in the vicinity of a position where spacer grid or spacer 20 will contact example embodiment fuel rod 16. It is understood that coating 26 may be of any desired thickness in example embodiments, and relative dimensions of coating 26 in FIG. 3 are merely examples. Further, although coating 26 is shown as an outer-most coating in some example embodiments, it is understood that additional finishes, coatings, and materials may be present on a portion or entirety of coating 26 and/or alongside the same.

Coating 26 may include a hard metallic material alone, including only transition metals. For example, coating 26 may be a metallic alloy, such as a chromium-containing alloy like NiCrAlY, NiCr, FeCrAlY, FeCr, etc. in any combination. A hard metallic material forming coating 26 may have a thickness of between about 10 microns and about 175 microns, such as about 75 microns.

Coating 26 may further include combinations of metal matrices and ceramics and/or metal oxides. Example metal matrices include metallic alloys like those useable as a solo hard metallic material including chromium-containing alloys, as well as alloys useable in cladding tube 22 like zirconium-tin alloys including Zircaloy-2. Examples of ceramic and metal oxide hard phase materials include $ZrO_2$, $Al_2O$, $Cr_2O_3$, $TiO_2$, $Cr_3C_2$, TiC, SiC, etc. in any combination. Coatings 26 including a metal matrix and ceramic or metal oxide hard phase materials may be about 10 microns to about 175 microns thick.

A metal matrix in coating 26 may provide corrosion resistance, toughness and/or improved adhesion. A ceramic or metal oxide hard phase material combined with the metal matrix in coating 26 may provide additional hardness and wear resistance.

Example methods include application of a wear-inhibiting coating to a component using a thermal spray. For example, coatings can be applied to nuclear reactor components expected to be subject to harsh conditions in an operating nuclear reactor environment, or coatings can be applied to nuclear fuel rods to form example embodiment fuel rods discussed above in accordance with example methods.

An example thermal spray is a cold spray. A cold spray is defined herein to exclude applications or depositing methods that use heat to bond a coating to a substrate such that phase changes and/or oxidation can occur to a non-negligible extent in the materials. In an example cold spray, powderized coating materials are deposited with substantial velocity on a substrate in order to plastically deform the particles into a flattened, interlocking material that forms a coating. By using force and resultant mechanical deformation, cold spray may avoid substantially heating any powder or substrate, such that a coating may be formed mechanically without significant phase changes or chemical reactions. In a specific example, powderized particles feed are entrained in a high velocity inert gas flow. The high velocity inert gas may be a noble gas such as argon or helium, for example, or any other gasses that present acceptably low chemical interaction with the powderized particles and substrate. The high velocity inert gas can be acquired from a high-pressure or pneumatic source, for example.

Powderized particles may be fabricated of metallic and/or ceramic/metal oxide hard phase materials in example methods using cold spray. For example, in order to form hard metallic coatings discussed above in connection with some example embodiment nuclear fuel rods, particles may be a Chromium-containing alloy. Or for, example, in order to form a coatings of a metallic matrix with ceramic or metal oxide hard phase material discussed above in some example embodiment nuclear fuel rods, particles may be a Chromium or Zirconium metallic alloy for the metal matrix and $ZrO_2$, $Al_2O$, $Cr_2O_3$, $TiO_2$, $Cr_3C_2$, TiC and/or SiC for the ceramic or metal oxide hard phase material in any combination or ratio. As an example, using a dual metal matrix and hard phase powder for a coating containing the same, the hard phase material may be approximately 10 to approximately 20 weight-percent of the powders.

Powderized materials may be mixed and entrained together from a single feeder or fed from different feeders during simultaneous multiple sprays. Powder particles used in example methods can be any size that permits entrainment and even particle deposition and deformation and coating formation. For example, powder particles may be approximately 5 to about 20 microns; similarly, particles may be of a relatively same size or fall within a tolerance range to ensure even results and coating, such as about 5 microns to about 16 microns powder particle size.

In an example method using a cold spray thermal treatment, the entrained particles and inert gas are flowed at supersonic or substantial speeds, such as about 500 to about 1500 meters per second, toward the substrate on which a coating is to be formed. Such speeds may be achieved pre- or post-entrainment. For example, inert gas and entrained particles may be mixed and directed through a properly-sized converging/diverging nozzle to achieve speeds over about 500 m/s. The super-speed gas and particulate flow may be heated during flow to account for adiabatic temperate loss through any diverging or diffuser section and achieve an isothermal process without significant phase change or oxidation.

The substrate may be exposed to the entrained flow for any desired amount of time until a coating has formed to a desired thickness or mass. For example, in the case of a fuel rod, sections of the rod requiring wear-resistant coating may be exposed to the high-velocity cold spray until a coating of about 10 microns to about 175 microns is formed about a circumference of the rod throughout the indicated section.

Coated substrates or sections may be shot peened in order to smooth and/or densify any coating and surface. For example, stainless steel particles of about 100 to about 200 micron may be flowed at the coated surface at approximately 5 to approximately 20 bar and 400 degrees Celsius. Particles will significantly cool before interacting with a coasted surface and not heat the surface to phase change or oxidation temperatures. Multiple passes of peening may be applied until a coasting surface finish and density is achieved, such as 10-30 passes. Other peening materials and conditions may be used if different characteristics are desired.

Example methods using a cold spray may explicitly omit surface grit blasting of a substrate. Surface grit blasting is typically desirable or even required in thermal methods such as HVOF or HVAF to prepare the substrate to receive and adhere to high-temperature metallic or matrix/hard-phase depositions. Grit blasting can introduce surface defects and potential weaknesses in a substrate; further, grit blasting may be difficult to evenly and consistently apply to various surfaces. As such, grit blasting may be particularly disfavored in manufacturing components that require consistent and high-performing strengths, including nuclear components. Example methods using a cold spray may achieve coating deposition and substrate/coating adhesion without grit blasting and its potential drawbacks.

Example methods using a cold spray do not encounter effects caused by high-temperature fabrication and/or deposition methods. Temperatures beyond those used in cold spraying may cause oxidation and/or phase changes in materials being deposited to form a wear-resistant coating, which may require additional precautions and/or material working in order to avoid or repair. Cold spray, using high flow speeds and low temperature to form a coating or layer through mechanical deformation may further help retain the deposited material's or materials' initial properties, including higher thermal and electric conductivities, while providing a high hardness and cold-worked microstructure that is resilient against wear in demanding conditions like an operating nuclear power plant environment. The high velocities in cold spray also result in improved coating-substrate adhesion, which benefits from plastic impaction without phase change or oxidation in the coating to reduce adhesion.

It is understood that example methods may use other deposition and coating methods aside from, or in addition to, the example of cold spray detailed above. For example, HVOF and/or HVAF may be used to form coatings including a ceramic like SiC or TiC and a metal matrix like Zircaloy-2, or any other materials useable in example embodiments.

Figure 4:
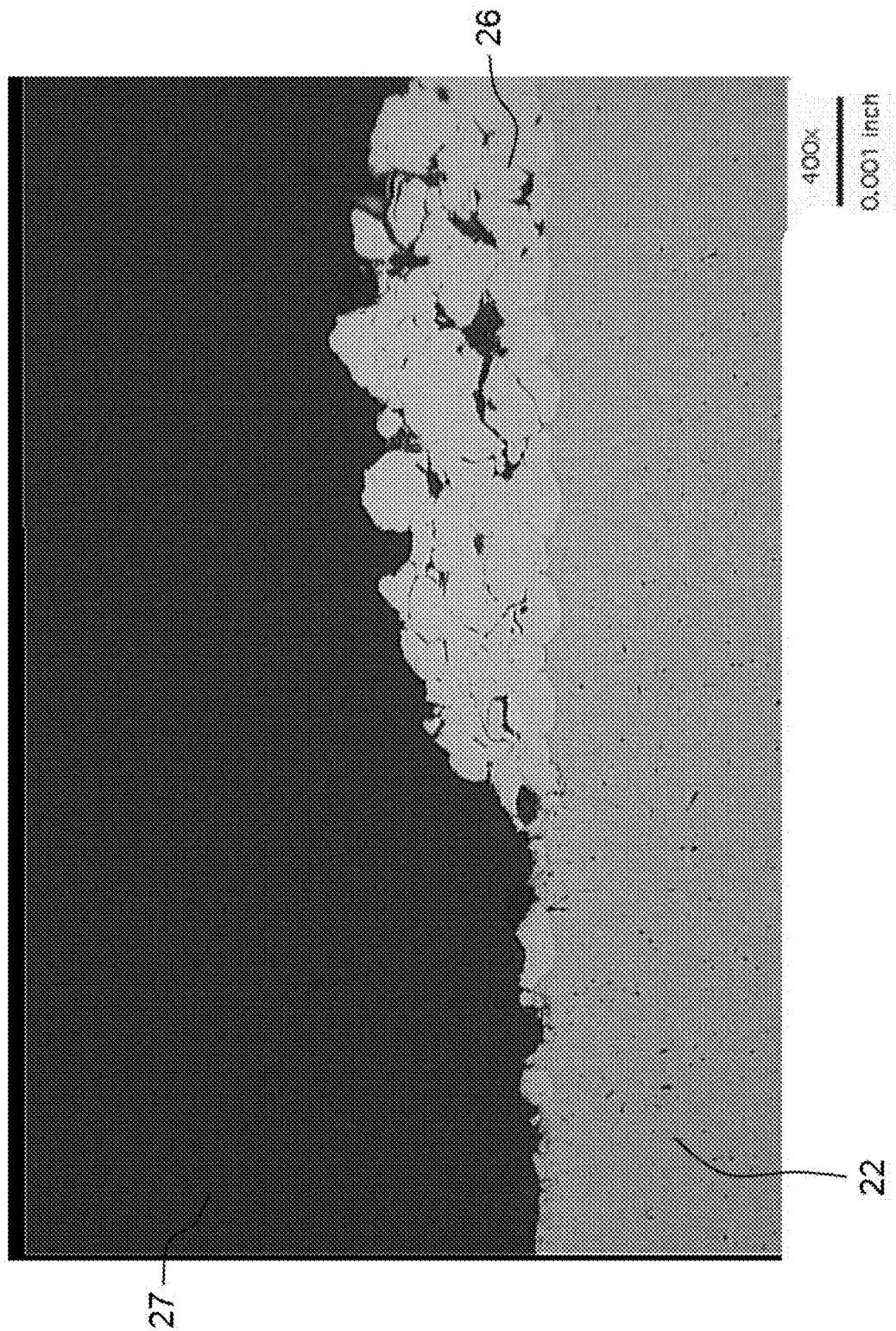
FIG. 4 is a cross-sectional micrograph of an example embodiment fuel rod.
Figure 5:
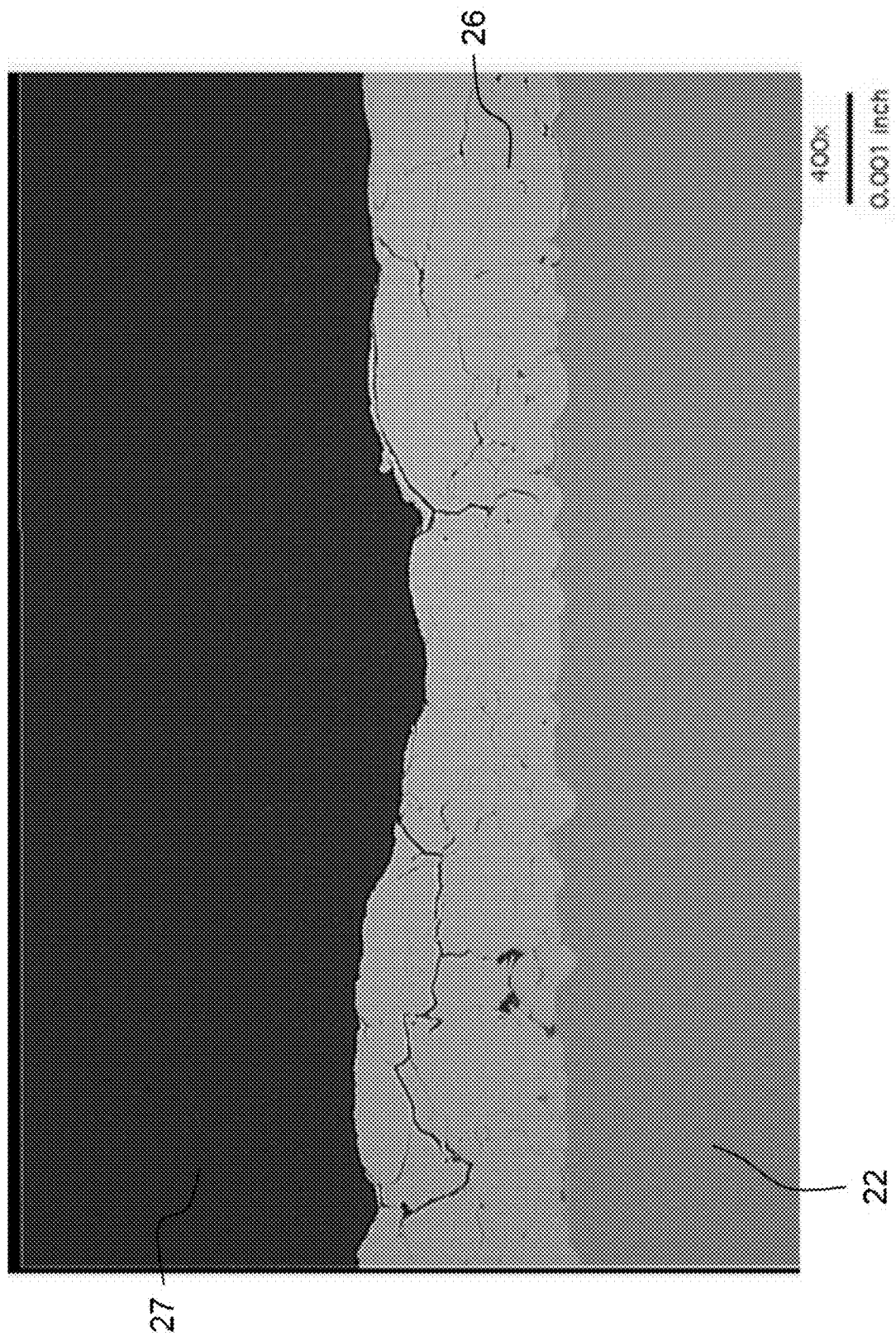
FIG. 5 is a cross-sectional micrograph of another example embodiment fuel rod.

FIGS. 4 and 5 are sectional micrographs of example embodiment fuel rods coated using example methods with cold spray. FIG. 4 is a micrograph of an example embodiment fuel rod with outer cladding 22 formed of a zirconium alloy that has been coated using a cold spray example method to form coating 26 of FeCrAlY. Cladding 22 and coating 26 were mounted in an epoxy mold 27 for metallographic preparation. As seen in FIG. 4, surface of cladding tube 22 can be undamaged by grit blasting preparation, showing in the micrograph as relatively consistent and well-defined. Coating 26 adheres nearly completely and without damage to a surface of cladding 22, as seen by a well-defined and continuous boundary between cladding 22 and coating 26. Dark areas within coating 26 are voids.

FIG. 5 is a micrograph of an example embodiment fuel rod similar to that of FIG. 4, with outer cladding 22 that has been coated using a cold spray example method to form coating 26. Coating 26 has been shot-peened in accordance with example methods in FIG. 5. As seen in FIG. 5, coating 26 is densified with fewer voids while maintaining a well-defined and continuous boundary between cladding 22 and coating 26.

Example embodiments and methods thus being described, it will be appreciated by one skilled in the art that examples may be varied and substituted through routine experimentation while still falling within the scope of the following claims. For example, although some example embodiments and methods are described with specific elements for a hard phase material and metal matrix, it is understood that example embodiments and methods may include any type of ceramic, metal oxide, and/or metal. Further, it is understood that example embodiments and methods can be used in connection with any type of technology, including any type of nuclear fuel and reactor, where wear on components is at issue, including BWR, PWR, heavy-water, fast-spectrum, graphite-moderated, etc. reactors. Such variations are not to be regarded as departure from the scope of the following claims.

What is claimed is:

1. A fuel assembly with enhanced wear resistance, the fuel assembly comprising:
   an upper tie plate;
   a lower tie plate;
   a plurality of fuel rods extending between the upper and the lower tie plates; and
   a fuel spacer in a middle portion of the assembly through which the plurality of fuel rods pass, wherein at least one fuel rod of the plurality of fuel rods includes,
   nuclear fuel pellets,
   a cladding tube having a zirconium alloy outer surface, and
   a wear-inhibiting coating bonded to the outer surface where the spacer directly contacts the fuel rod, wherein the coating includes a metallic material that consists only of transition metals, wherein the coating further includes at least one of a ceramic hard-phase material and a metal oxide hard-phase material, wherein the total hard-phase material is approximately 10-20 weight percentage of the coating, and wherein the coating is applied by a cold spray.

2. The fuel assembly of claim 1, wherein the metallic material forms a metal matrix including the hard-phase material.

3. The fuel assembly of claim 2, wherein the metallic material is an alloy including at least one of chromium and zirconium.

4. The fuel assembly of claim 3, wherein the hard-phase material is at least one of $ZrO_2$, $Al_2O$, $Cr_2O_3$, $TiO_2$, $Cr_3C_2$, TiC and SiC.

5. The fuel assembly of claim 3, wherein the metallic material includes Zircaloy-2, and wherein the hard-phase material includes SiC or TiC.

6. A cladding tube for a nuclear fuel rod, the cladding tube comprising:
   a zirconium alloy outer surface; and
   a wear-inhibiting coating bonded to the outer surface,
   wherein the coating includes a metallic material that consists only of transition metals,
   wherein the coating further includes at least one of a ceramic hard-phase material and a metal oxide hard-phase material,
   wherein the total hard-phase material is approximately 10-20 weight percentage of the coating,
   wherein the coating is applied by a cold spray, and
   wherein the cladding tube is configured to hold nuclear fuel pellets.

7. The fuel rod of claim 6, wherein the metallic material is an alloy including at least one of chromium and zirconium.

* * * * *